United States Patent [19]

Kreuter et al.

[11] Patent Number: 4,787,071
[45] Date of Patent: Nov. 22, 1988

[54] PIEZOELECTRIC/FLUID PRESSURE TRANSDUCER APPARATUS

[75] Inventors: Paul E. Kreuter; Larry G. Odegaard, both of Thief River Falls, Minn.

[73] Assignee: Kreuter Manufacturing Co., Inc., New Paris, Ind.

[21] Appl. No.: 24,968

[22] Filed: Mar. 12, 1987

[51] Int. Cl.$^4$ .............................................. H04R 23/00
[52] U.S. Cl. ................... 367/140; 251/129.06; 60/370; 60/381
[58] Field of Search .................. 367/140; 251/129.06; 60/370, 381, 393

[56] References Cited

U.S. PATENT DOCUMENTS

| | | | |
|---|---|---|---|
| 3,414,010 | 12/1968 | Sparrow | 251/129.06 |
| 4,340,083 | 7/1982 | Cummins | 251/129.06 |
| 4,492,360 | 1/1985 | Lee, II et al. | 251/129.06 |
| 4,616,477 | 10/1986 | Baumeler | 60/407 |
| 4,617,952 | 10/1986 | Fujiwara et al. | 251/129.06 |
| 4,644,748 | 2/1987 | Goss et al. | 60/395 |
| 4,690,465 | 9/1987 | Takeda et al. | 251/129.06 |

OTHER PUBLICATIONS

Pp. 1–18 of booklet from Vernitron Piezoelectric Division, Entitled "Piezoelectric Technology Data for Designers".

Primary Examiner—Charles T. Jordan
Assistant Examiner—John W. Eldred
Attorney, Agent, or Firm—Kinney & Lange

[57] ABSTRACT

A flat, elongate, laminated plate of ceramic piezoelectric material is fixedly mounted on one end to permit movement of the other end responsive to the application of a variable electronic control signal to electrodes on the outer surfaces of the laminated plate. The movement and force applied by the movable end of the plate controls the release of air pressure from the pressure chamber so that the pressure in the chamber varies in response to the variations of the electronic control signal.

8 Claims, 2 Drawing Sheets

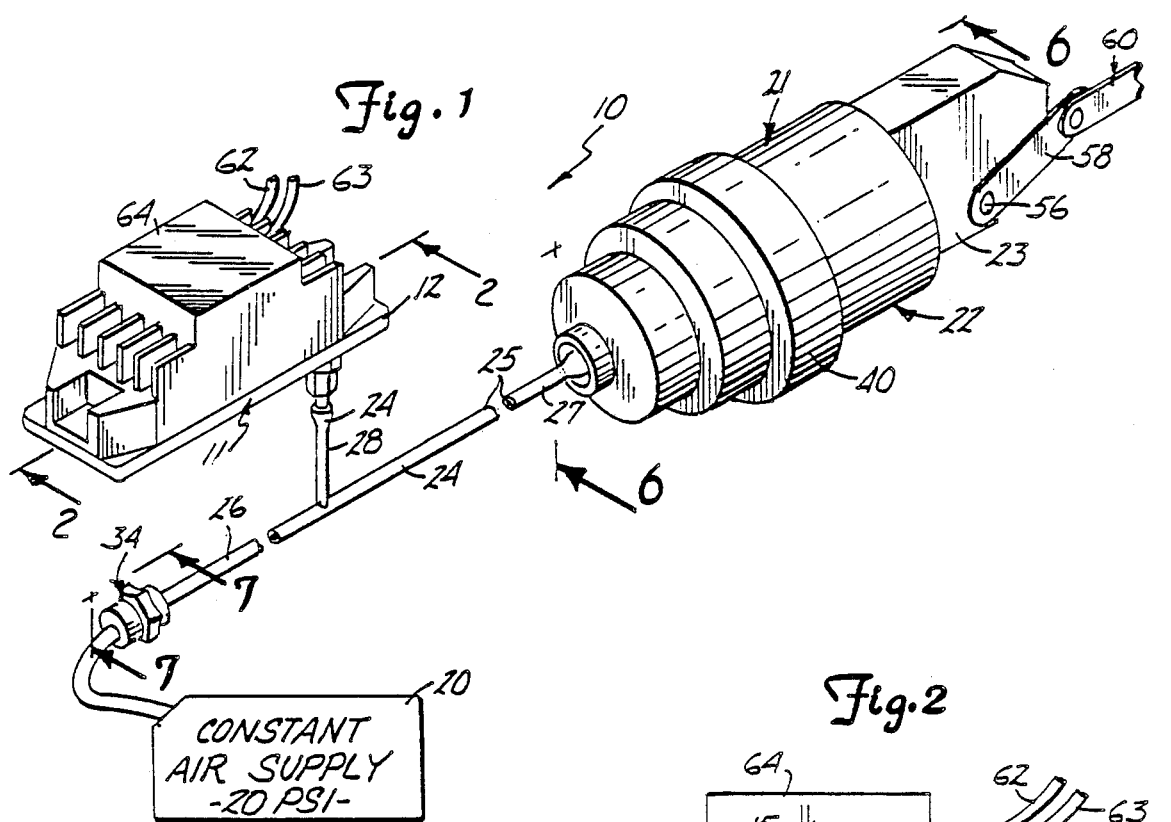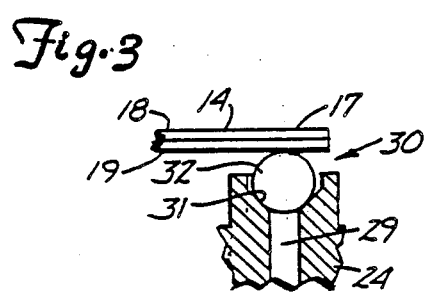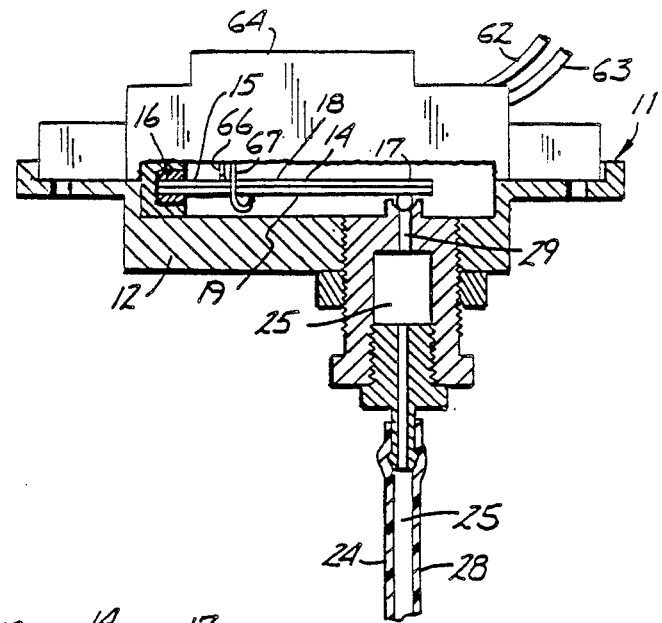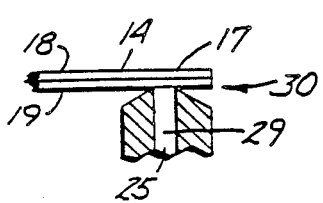

PIEZOELECTRIC/FLUID PRESSURE TRANSDUCER APPARATUS

BACKGROUND OF THE INVENTION

1. Field of the Invention.

This invention has relation to apparatus for utilizing the changes in shape of piezoelectric material due to changing electrical signals applied to the material to develop a fluid pressure in a fluid flow conduit which varies with the variations in the electrical signal applied to the piezoelectric material.

This invention has initially found its greatest utility where the fluid pressure is a pneumatic pressure, and where the fluid involved is air.

2. Description of the Prior Art.

It is known to develop a variable air pressure for operating a pneumatic linear motor by supplying air from a constant pressure source through a restrictor to a pressure chamber open to the linear motor, and varying the pressure in the chamber by mechanically controlling a pressure relief valve to bleed off air in the chamber. Mechanical means for operating such valving have heretofore proved unduly slow, imprecise, unresponsive to minute changes and/or unacceptably expensive for use in certain applications.

It is a known that certain crystals such as quartz, Rochelle salt, tourmaline, and barium titanate, have piezoelectric properties such that when an electrical field is applied to them, the crystal changes shape. Piezoelectric materials in common use as electromechanical transducers include barium titanate and four variations of lead zirconate-lead titanate ceramics. These ceramics are polycrystalline in nature. Piezoelectric behavior is induced in these ceramic materials by a polarizing treatment.

It is known to join two transverse-expander plates of piezoelectric ceramic material together face-to-face in such a manner that a voltage applied to two electrodes each in contact with an outer face of a different one of the plates will cause the plates to deform in opposite directions, resulting in a bending action. Such piezoelectric elements were developed by Vernitron and are available under the trade name BIMORPH. Such BIMORPH brand plates can be used in series operation by being positioned between silver foil electrodes.

What was lacking before the present invention was a transducer apparatus which could control the operating pressure in a pressure chamber so that it would vary substantially instantaneously with variation in an electrical control signal, and which was responsive to even the minutest variations in the magnitude of that signal.

SUMMARY OF THE INVENTION

A transducer apparatus utilizing a varying electronic signal for developing a varying fluid pressure in a chamber for actuating a pressure actuated work device is disclosed herein as an apparatus for developing a varying pneumatic pressure for actuating a pneumatic linear motor such as a rotary actuator. However, by utilizing a hydraulic accumulator open to the chamber supplying the pressure to the pressure actuated work device, liquids can be utilized in the transducer apparatus of the invention.

A transducer apparatus for developing a varying fluid pressure for actuating a pressure actuated work device responsive to the magnitude of a varying electronic signal includes a piezoelectric/fluid pressure control unit having a base, a plate of piezoelectric material fixedly mounted at a first portion thereof with respect to the base, a second portion of the piezoelectric plate being free to vary its position responsive to application of a variable electronic signal applied to opposed faces of the plate, and means for transmitting such a variable electric control signal to such opposed faces of the plate. A fluid flow conduit providing a fluid flow cavity or chamber has a first flow input portion, a second working portion open to a pressure actuated work device, and a third pressure relief and flow output portion which is open to the fluid flow chamber between the first and second portions. A source of fluid under pressure is connected to the first flow input portion through a fluid flow restrictor. A pressure relief valve means is open to the third portion of the fluid flow conduit and includes a valve seat fixedly mounted with respect to the base, the valve seat being provided with a pressure relief and flow orifice open to the fluid flow chamber through the third output portion of the conduit.

A valve including the second portion of the piezoelectric material is situated in operational alignment with the valve seat in position whereby fluid under pressure in the fluid flow chamber tends to flow through the pressure relief and flow orifice and the valve seat to tend to force the valve away from the valve seat and whereby a change of position of the second portion of the piezoelectric material responsive to the varying of the magnitude of the electronic signal transmitted to that material changes the force with which the valve resists the flow of fluid from the chamber through the valve seat to the end that the pressure within the chamber varies with the variations of the signal transmitted to the piezoelectrical material.

BRIEF DESCRIPTION OF THE DRAWINGS

FIG. 1 is a perspective view of the main frame or base of a piezoelectric/fluid pressure control unit of a transducer of the present invention showing the association of that unit with perspective representations of pneumatic and mechanical elements used to generate and utilize a pneumatic pressure which varies responsive to the magnitude of an electrical signal applied to the control unit;

FIG. 2 is an enlarged vertical sectional view taken on the line 2—2 in FIG. 1 showing the relationship of a plate of piezoelectric material to a pneumatic pressure relief and flow orifice according to a first form of the invention;

FIG. 3 is an enlarged fragmentary vertical sectional view also on the line 2—2 in FIG. 1 and detailing the relationship of an outer end portion of the plate of piezoelectric material to the pneumatic pressure relief flow orifice as it forms part of a valve controlling the fluid flow through that orifice;

FIG. 4 is a fragmentary vertical sectional view similar to FIG. 3, but showing a second effective valve to valve seat relationship of the plate of piezoelectric material with respect to the pressure relief flow orifice;

DETAILED DESCRIPTION OF THE PREFERRED EMBODIMENTS

Figure 5:
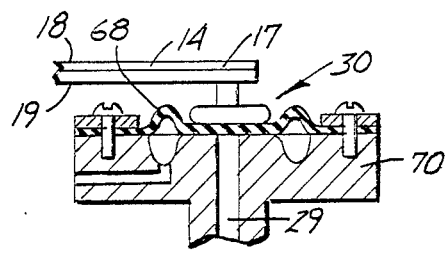
FIG. 5 is yet another fragmentary vertical sectional view of the plate of piezoelectric material similar to that seen in FIG. 3 with yet another valving relationship of the plate of piezoelectric material with respect to a pressure relief flow orifice.

A transducer apparatus 10 includes a piezoelectric/fluid pressure control unit 11 having a main frame or base 12, an elongate plate of ceramic piezoelectric material 14. This plate 14 has a first end portion 15 fixedly or rigidly mounted to the base 12 as at 16 and a second free end portion 17 in clearing relation to the base 12.

The piezoelectric plate 14 can be of the type sold by Vernitron under the trademark BIMORPH. It can consist of upper and lower laminates of ceramic piezoelectric material secured in face-to-face electrical contact with each other. An upper electrode 18 of silver foil, for example, can be bonded to the top surface of the upper laminate and a similar lower electrode 19 can be bonded to the bottom surface of the lower laminate.

In the form of the invention as shown, the apparatus also includes a source 20 of air under pressure, a pressure actuated work device 21 in the form of a pneumatic linear motor 22 serving as a rotary actuator 23, and fluid or air flow conduit 24 providing a fluid or air flow chamber 25 open between the air pressure source 20 and the linear motor 22.

Air flow conduit 24 has a first fluid or air flow input portion 26, a second working portion 27 and a third pressure relief and fluid or flow output portion 28. This third portion of conduit 24 is provided with a pressure relief and air flow orifice 29 open between air flow chamber 25 and the atmosphere. This third portion 28 of the conduit 24 is fixedly positioned with respect to the main frame or base 12 so that the orifice 29 is directly below the free end portion 17 of the piezoelectric ceramic plate 14 as seen in FIGS. 2 through 5. The third portion 28 of air flow conduit 24 effectively terminates in a valve means 30. In the first form of the invention, as seen in FIGS. 2 and 3, this valve means includes an upwardly facing conical valve seat 31 and a spherical ball 32 nominally resting in closing relation to the valve seat.

A fluid or air flow restriction means 34 is situated between input portion 26 of the air flow conduit 24 and the air pressure source 20. This restriction means limits the flow of air into the air flow chamber 25 from the pressure air source 20 sufficiently so that the pressure in the air flow chamber 25 at any particular point in time can be varied by varying the amount of outward flow through the air flow orifice 29. The more flow permitted through the orifice 29, the lower is the pressure in the air flow chamber 25. This air flow restriction means 34 can be in the form of a permanent restriction, or can be, as shown here, in the form of a coupling 36 encompassing a replaceable air restrictor disk 38 having an air passage 39 therethrough. By using several different air restrictor disks 38 with air flow passages 39 of different areas, the operating parameters of the transducer apparatus 10 can be modified as may prove necessary or desirable.

Any pressure responsive device or pressure actuated work device open to the air flow chamber 25 will be operable responsive to the changes of pressure in that chamber. The uses of such devices are many. For example, such devices can control and operate valve operators, damper operators, receiver controllers and the like.

Figure 6:
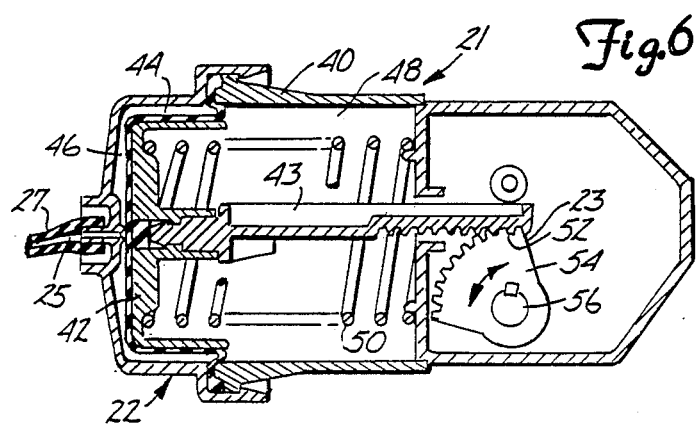
FIG. 6 is a vertical sectional view taken on line 6—6 in FIG. 1 of a fluid pressure actuated work device in the form of a linear motor or rotary activator.
Figure 7:
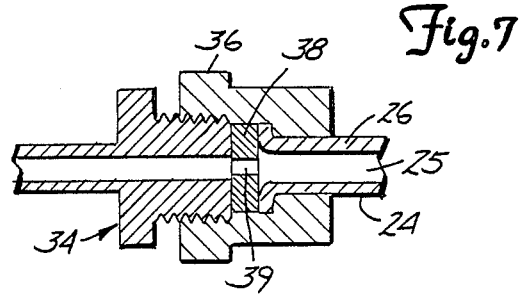
FIG. 7 is an enlarged vertical sectional view through a flow restrictor means taken on the line 7—7 in FIG. 1.

In the form of the invention as shown, the pressure actuated work device is the pneumatic linear motor 22 which includes a casing 40, a piston 42 and a piston rod 43 slidably mounted within the casing. A diaphragm 44 separates the casing into a pressure compartment 46 and a open compartment 48 open to the atmosphere. A spring 50 tends to hold the piston 42 and piston rod 43 in the position as seen in FIG. 6, and pressure in the air flow chamber 25 operates to tend to move the piston rod to the right as seen in that figure to rotate a gear segment 52 of a rotary actuator lever 54 to the end that a rotary actuator shaft 56 causes an actuator arm 58 to control a damper operator arm 60. This will allow the damper itself (not shown) to be positioned in an infinitely different number of positions responsive entirely, substantially instantly and precisely to changes in the pressure in the air flow chamber 25.

This control of the air pressure in air flow chamber 25 by some kind of a valve means to control the rate of flow of air out of the chamber 25 by some kind of a valve means is known in the prior art. However, such valve means have, in the past, been cumbersome in their operations due to the mass of the valve parts and the mechanical and/or electronic means used to control the valve parts. Therefore, before the present invention, it was not possible to effectively control a valve means for developing a pressure within an air flow chamber which would follow precisely and substantially instantaneously variations in the magnitude of an electronic signal developed to control the pressure in the chamber and hence the operation of a pressure responsive device such as a pneumatic linear motor forming part of a rotary actuator.

OPERATION

In describing the operation of the transducer apparatus of the invention, it is assumed, by way of example, that the object is to position a damper (not shown) of a heating, ventilating and air conditioning system by control of its damper operating arm 60 through rotation of rotary actuator arm 58 all in accordance with the magnitude of an electronic signal provided through input lines 62 and 63 to the control unit 11. This control signal to electrical input lines 62 and 63 will vary in magnitude in accordance with the desired positioning of the damper, the damper operator arm 60 and, consequently, the actuator arm 58. The damper can be completely closed or completely open or constantly fluctuating between opened and closed condition as it precisely responds to the magnitude of the electronic signal being imposed on electrical input signal lines 62 and 63.

Whether such input signal is digital, amplitude modulated or frequency modulated alternating current, or direct current, it will be converted into a direct current signal in a signal converter box 64 of the control unit 11 using any usual or preferred circuitry, forming no part of the present invention per se. This corrected output is transmitted on output signal lines 66 and 67 to silver foil electrodes 18 and 19 bonded to the top and bottom surfaces of the plate 14.

In one form of operation, as the magnitude of the electrical signal applied to the electrodes 18 and 19 by the output signal lines 66 and 67 increases, a BIMORPH plate 14 of ceramic piezoelectrical material will tend to deflect in downward direction as seen in FIGS. 2 and 3, increasing the force on the spherical ball 32 thus tending to inhibit flow from the air flow chamber 25. This will cause a buildup of pressure in chamber 25 toward the maximum pressure available from pressure source 20. At some particular pressure, the force of plate 14 will be overcome, the ball will raise allowing pressure to escape and an equilibrium will be established at that particular pressure.

By way of example, it will be assumed that the transducer apparatus is designed and adjusted to produce a pressure in pressure chamber 25 which varies between three and fifteen pounds per square inch (psi) with a variation of from zero volts to 200 volts of direct current excitation across the electrodes 18 and 19, using a constant source 20 of air under pressure of twenty psi. When no voltage is applied across output signal lines 66 and 67, the relationship of the parts will be such that only sufficient force will be applied by second free end portion 17 of BIMORPH plate 14 on spherical ball 32 such that an equilibrium is reached between the air-lifted ball 32 and the valve seat 31 sustaining a three psi pressure inside of the chamber 25. The piston 42 will then be deflected to the right as seen in FIG. 6 until an equilibrium is reached balancing the force of the three psi acting on the diaphragm 44 and piston 42 will balance with the force exerted by the spring 50.

As the voltage on output terminals 66 and 67 is increased, an equilibrium will be substantially immediately reestablished between the physical positioning of the ball 32 and the valve seat 31 with the ball closer to the valve seat and with the pressure in the pressure chamber 25 commensurately increased. When the output voltage across the signal lines 66 and 67 reaches 200 volts of direct current excitation, the force exerted by the free end 17 of the plate 14 will be such that the ball is maintained in much closer relationship to the valve seat, and the pressure and the pressure chamber will be established at fifteen psi.

Minute changes in the excitation voltage across the electrodes of the ceramic plate 14 substantially instantaneously result in establishing new equilibrium pressures within the chamber 25 exactly representative of the magnitude of those changes. This reduces or virtually eliminates any lag between the change in pressure applied to a pressure responsive device such as pneumatic linear motor 22 and the application of an electronic signal to the piezoelectrical material calling for such pressure change.

It is not necessary that the ball 32 be a part of the valve means 30. A substantial number of different constructions can be used to cause the force exerted by the free end portion 17 of the BIMORPH plate 14 to control the pressure developed inside of pressure chamber or air flow chamber 25. For example, in FIG. 4, the second free end portion 17 of the plate 14 is seen to rest directly over the output end of the pressure relief and air flow orifice 29 provided in the third pressure relief and flow output portion 28 of the air flow conduit 24. Here the free end portion 17 will be forced into spaced relation with respect to the outer end of the air flow orifice 20 sufficiently so that an equilibrium is reached between the outer end of the plate 14 and the orifice 29, and the pressure in the air flow chamber will be a function of that spacing.

Similarly, in FIG. 5, the outer end portion 17 of the plate 14 exerts pressure on the top outside surface of a diaphragm 68 held in a modified block 70 which can be fixedly mounted to the main frame or base 12 of the control unit 11. The less pressure exerted by the second free end portion 17 of the plate, the more the diaphragm 68 will be lifted away from the air flow orifice 29 by the escape of air from chamber 25, and the lower will be the pressure inside of that chamber. As the pressure exerted by the ceramic plate 14 tending to seal the diaphragm against the orifice 29 increases, the pressure inside of air flow chamber 25 will also increase.

A BIMORPH brand of elongated piezoelectric ceramic plate material is illustrated herein because of the relatively large mechanical force which can be applied by it responsive to changes in magnitude of electronic signal applied to it. It is to be understood, however, that any valve means which is responsive to a change in position or size or shape due to piezoelectric effect can be utilized within the spirit of the invention and the scope of the claims which follow. For example, when signal lines such as output signal lines 66 and 67 are connected to piezoelectric crystals in such a manner that increase of the magnitude of the electric signal to those lines causes the piezoelectric crystal to grow or otherwise move in a first direction, valve means responsive to this movement can be placed in operable contact with these crystals. This valve means will exert more force tending to retard flow from the pressure chamber 25 and, when a signal of greater magnitude is applied, and will exert less force when a signal of lesser magnitude is applied.

Although the present invention has been described with reference to preferred embodiments, workers skilled in the art will recognize that changes may be made in form and detail without departing from the spirit and scope of the invention.

What is claimed is:

1. Transducer apparatus for actuating a fluid pressure actuated work device by developing a fluid pressure which constantly varies as a function of the magnitude of a varing electronic signal impressed on it, said apparatus including:

A. a base;
   B. a plate of piezoelectric material having a first portion fixedly mounted to said base and a second portion spaced from the first portion;
   C. means for applying a variable electronic signal across opposed portions of piezoelectric material of the plate so as to induce a variable piezoelectric effect as a function of such signal;
   D. a constant source of fluid under constant pressure;
   E. a fluid flow conduit having a first flow input portion open to said source of fluid under pressure, a second working portion open to a pressure actuated work device, and a third pressure relief and flow output portion, said conduit providing a fluid flow chamber which is partially defined by the first, second and third conduit portions;
   F. a flow restrictor of fixed predetermined size between said source of fluid under pressure and said fluid flow chamber;
   G. the third flow output portion of said fluid flow conduit being provided with a pressure relief and flow orifice open to said fluid flow chamber between its first input portion and its second working portion, said orifice being fixedly mounted with respect to the base and positioned in adjacent functionally operable relation to said second portion of said plate; and
   H. means including the second portion of the plate for constantly varying the magnitude of outward flow through the fluid flow conduit chamber orifice in accordance with the variations of the magnitude of the electrical signal applied to the piezoelectric material.

2. Transducer apparatus for actuating a pressure actuated work device by developing a pneumatic pressure which varies constantly as a function of the magnitude of a varying electronic signal impressed upon it, said transducer apparatus including:
  A. a piezoelectric/pneumatic pressure control unit including:
    (1) a base,
    (2) a plate of piezoelectric material having a first end portion fixedly mounted with respect to said base and a second end portion free to move in a predetermined plane responsive to application of a varying electronic signal across opposed portions of the piezoelectric material of the plate, and
    (3) means for transmitting a variable electronic control signal to such opposed portions of said plate so as to induce a variable piezoelectric effect as a function of such signal;
  B. a constant source of gas under constant pressure;
  C. a gas flow conduit having a first flow input portion open to said source of gas under pressure, a second working portion open to a pressure actuated work device, and a third pressure relief and flow output portion between said first and second conduit portions, said conduit providing a gas flow chamber which is partially defined by said first, second and third conduit portions;
  D. a gas flow restrictor of fixed predetermined size situated between said source of gas under pressure and said gas flow chamber;
  E. the third flow output portion of the gas flow conduit being provided with a pressure relief and flow orifice;
  F. pressure relief valve means open to the third portion of said gas flow conduit, said valve means including:
    (1) a valve seat fixedly mounted with respect to the base and situated in surrounding relation to the pressure relief and flow orifice of the fluid flow conduit, and
    (2) a valve including said second portion of said plate of piezoelectric material, said valve being in operational alignment with said valve seat;
  G. wherein gas pressure in said fluid flow chamber tends to force said valve away from said valve seat to permit gas to flow from the chamber to tend to reduce the pressure in the chamber; and
  H. wherein physical piezoelectric-induced variations in said plate of piezoelectric material responsive to the varying of the magnitude of an electronic signal transmitted to said piezoelectric material varies the force with which the valve resists the flow of gas from the chamber through the valve seat to the end that the pressure within the chamber at all times is a function of the magnitude of the electronic signal being transmitted to the piezoelectric material.

3. The transducer apparatus of claim 2 wherein:
  I. the valve seat of the pressure relief valve means is provided with an outwardly diverging conical surface, a cylindrical ball is positioned in nominally closing relationship to said valve seat by being in contact with the conical surface around its entire periphery, and the second portion of the plate of piezoelectric material is positioned to nominally hold said ball in sealing relation to said valve seat; and
  J. the predetermined plane in which the second end portion of the piezoelectric plate is free to move is a plane coincident with the axis of the conical surface of the valve seat.

4. The transducer apparatus of claim 3 wherein:
  K. the gas supplied from the source of gas under pressure is air.

5. The transducer apparatus of claim 2 wherein:
  I. the valve seat of the pressure relief valve means is provided with a plane, flat outermost sealing surface lying perpendicular to the axis of the third flow output portion of the gas flow conduit at the pressure relief and flow orifice, and the second end portion of the plate of piezoelectric material is nominally positioned in contacting, sealing relationship to said valve seat.

6. The transducer apparatus of claim 5 wherein:
  J. the predetermined plane in which the second end portion of the plate of piezoelectric material is free to move is a plane normal to the plane of the valve seat.

7. The transducer apparatus of claim 2 wherein:
  I. the pressure relief valve means additionally includes a flexible diaphragm situated between the valve seat and the second portion of the plate of piezoelectric material, said second portion nominally holding the diaphragm in sealing relationship to the valve seat, there being a open passageway between the gas flow chamber through the third flow output portion of the gas flow conduit to the atmosphere when, in the operation of the apparatus, the diaphragm is lifted into clearing relationship with respect to the valve seat.

8. The transducer apparatus of claim 2 wherein:
  I. the plate of piezoelectric material includes at least two laminates of ceramic piezoelectric material bonded face-to-face.

* * * * *